United States Patent [19]

Inada et al.

[11] 4,216,938
[45] Aug. 12, 1980

[54] SOLENOID ACTUATED VALVE DEVICE

[75] Inventors: Masami Inada, Kariya; Takeharu Ohumi, Toyota; Masaru Tsunekawa, Fujioka, all of Japan

[73] Assignee: Aisin Seiki Kabushiki Kaisha, Kariya, Japan

[21] Appl. No.: 932,077

[22] Filed: Aug. 8, 1978

[30] Foreign Application Priority Data

Aug. 18, 1977 [JP] Japan .................................. 52-98929
Nov. 22, 1977 [JP] Japan .................................. 52-140140
Nov. 24, 1977 [JP] Japan .................................. 52-140916
Nov. 24, 1977 [JP] Japan .................................. 52-157579[U]

[51] Int. Cl.² ........................................... F16K 31/08
[52] U.S. Cl. ....................................... 251/65; 251/139
[58] Field of Search .................................. 251/139, 65

[56] References Cited

U.S. PATENT DOCUMENTS 2,637,343   5/1953   Matthews ............................. 251/65
3,001,549   9/1961   Nelson et al. ...................... 251/139 X

*Primary Examiner*—Arnold Rosenthal
*Attorney, Agent, or Firm*—Sughrue, Rothwell, Mion, Zinn and Macpeak

[57] ABSTRACT

A solenoid actuated valve device for electrically controlling the flow of fluid in response to electric signals. The valve device comprises a body member defining an internal chamber, a core being made of a magnetic material and comprising a central hollow portion, a bobbin slidably mounted on the core, a solenoid coil wound on the bobbin, a permanent magnet the magnetic flux of which may intersect at right angles to the winding of the solenoid coil, a yoke being made of a magnetic material and forming a magnetic circuit of the core, passages formed on the core, a sliding valve controlling the open area of the passages in response to the movement of the bobbin, and a spring biasing the bobbin so that the sliding valve may close the passages, whereby the flow of fluid may be controlled in proportion to the electric current.

15 Claims, 9 Drawing Figures

SOLENOID ACTUATED VALVE DEVICE

BACKGROUND OF THE INVENTION

1. Field of the Invention

This invention relates to solenoid actuated valve devices in general, and more particularly to a solenoid actuated valve device useful for controlling the flow of fluid in proportion to the electric current.

2. Description of the Prior Art

A solenoid actuated valve device of this type normally comprises a linear motor of movable coil type, and a valve means. The linear motor includes a core, a bobbin slidably mounted on the core, a solenoid coil wound on the bobbin, a permanent magnet whose magnetic flux intersect at right angles to the winding of the solenoid coil, and a yoke forming a magnetic circuit of the core. The bobbin slides on the core in response to the electric current flowing through the solenoid coil, whereby the valve means controls the flow of fluid in proportion to the electric current.

In such the conventional solenoid actuated valve device, however, it is so difficult to surely control the flow of fluid, in particular the small flow of fluid, in linear proportion to the electric current. Furthermore, there are such drawbacks that the structure is complicated, and that the production cost is relatively high.

SUMMARY OF THE INVENTION

It is a general object of the invention, therefore, to provide a new and improved solenoid actuated valve device for controlling the flow of fluid in linear proportion to the electric current.

It is another object of the invention to provide a solenoid actuated valve device for electrically controlling small flows of air in engine control system.

Other objects, features and advantages of the invention will become more apparent upon reference to the succeeding detailed description thereof, and by reference to the drawings showing the preferred embodiments thereof.

DETAILED EXPLANATION OF THE INVENTION

Figure 1:
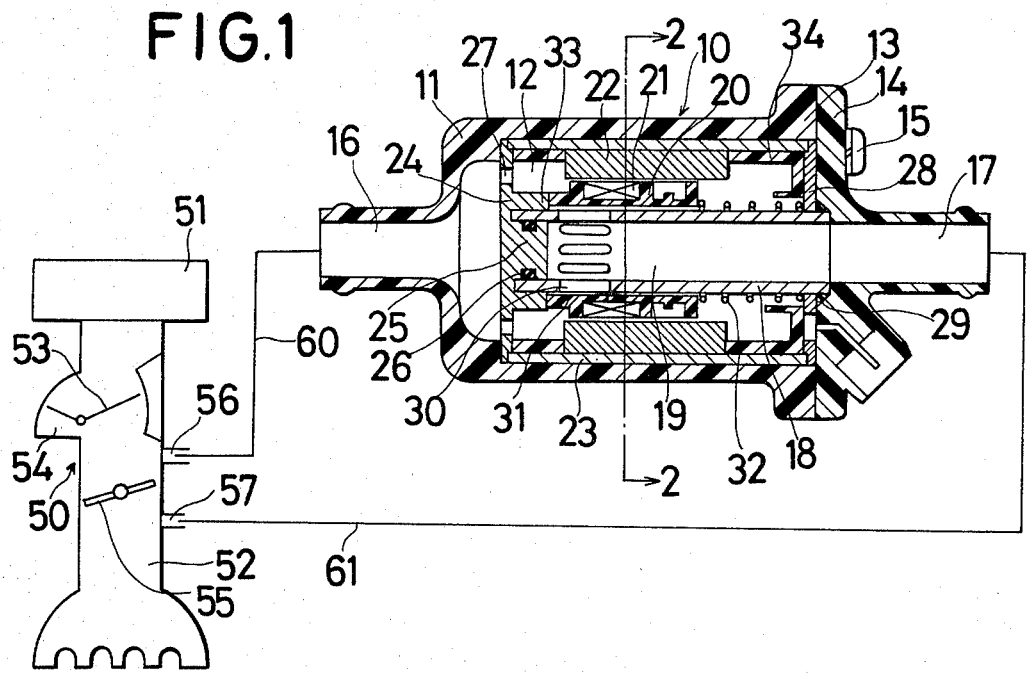
FIG. 1 is a schematic view of an electronic fuel injection system in an internal combustion engine incorporating a first embodiment of a solenoid actuated valve device according to the invention.
Figure 2:
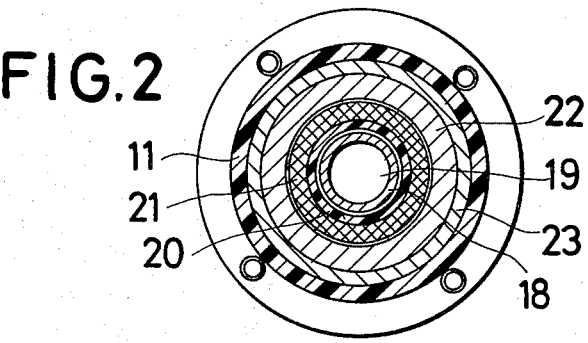
FIG. 2 is a sectional view of the solenoid actuated valve device in FIG. 1 taken along the line 2—2 of FIG. 1.

FIG. 1 illustrates schematically an electronic fuel injection system in an internal combustion engine incorporating the first embodiment of a solenoid actuated valve device according to the invention. Referring now to FIG. 1. a solenoid actuated valve device 10 of the present invention comprises a cup-shaped body member 11 defining a generally cylindrical internal chamber 12 therewithin and having a flange 13 at the open end thereof. A cover member 14 is sealingly connected to the flange 13 by a suitable connecting means such as a screw means 15, and closes the open end of the body member 11. The body member 11 has an inlet port 16 communicating with the internal chamber 12, while the cover member 14 has an outlet port 17.

Axially positioned in the internal chamber 12 is a core 18 which is made of a suitable magnetic material such as steel. The core 18 comprises a central hollow portion 19 communicating with the outlet port 17. Slidably mounted on the core 18 is a bobbin 20 which is made of a suitable nonmagnetic material such as synthetic resin. A solenoid coil 21 which generates the magnetic force is wound on the bobbin 20. A cylindrical permanent magnet 22 is so positioned that the magnetic flux of the magnet 22 may intersect at right angles to the winding of the solenoid 21. A yoke 23 made of a magnetic material is securely disposed in the inner peripheral surface of the body member 11 so that the yoke 23 may form a magnetic circuit of the core 18. The core 18, the solenoid 21, magnet 22, and the yoke 23 constitute a linear motor of movable coil type. The magnet 22 is supported by a support member 34 which is made of nonmagnetic material and inserted within the yoke 23. A pole member 24 made of a magnetic material is secured at the outer periphery thereof between the body member 11 and the left end of the yoke 23. The pole member 24 has a projection 25 which extends into the hollow portion 19 of the core 18. An O-ring 26 forms a seal between the projection 25 and the core 18. The pole member 24 has a plurality of passages 27 formed therethrough providing the communication between the inlet port 16 and the internal chamber 12. A plate member 28 made of a magnetic material is secured at the outer periphery thereof between the cover member 14 and the right end of the yoke 23. An O-ring 29 forms a seal between the plate member 28 and the core 18.

The core 18 has a plurality of passages 30 formed thereon which provide the communication between the hollow portion 19 and the internal chamber 12. The section of the passages 30 is elongated in the axial direction of the core 18. Since the bobbin 20 is slidably mounted on the core 18, a sliding valve 31 formed on the inner peripheral surface of the bobbin 20 can slide on the open portions of the passages 30. A coil spring 32 is axially positioned within the internal chamber 12. One end of the spring 32 engages the plate member 28, while the other end of the spring 32 abuts on the bobbin 20. Accordingly, the bobbin 20 is always biased toward the left, as viewed in FIG. 1, by the force of the spring 32.

In the absence of energization of the solenoid coil 21, the spring 32 maintains the bobbin 20 in engagement with a stop surface 33 of the pole member 24, whereby the sliding valve 31 is maintained in the rest position thereof closing the passages 30. Upon energization of the solenoid coil 21, the bobbin 20 moves to the right, as viewed in FIG. 1, overcoming the force of the spring 32 whereby the sliding valve 31 controls the open area of the passages 30.

In operation, the magnetic flux of the permanent magnet 22 forms a closed loop through the core 18 and the yoke 23, and a part of the magnetic flux passes through the solenoid coil 21. Under this condition, when the electric current flows through the solenoid coil 21, the force in the right direction, as viewed in FIG. 1, is generated in proportion to the electric current as well-known as Fleming's left-hand law. Accordingly, since the bobbin 20 moves to the right in proportion to the electric current overcoming the force of the spring 32, the sliding valve 31 controls the open area of the passages 30. That is to say, the open area of the passages 30 is controlled in proportion to the displacement of the sliding valve 31 in the right direction. As a result, the fluid volume flowing from the inlet port 16 to the outlet port 17 is in linear proportion to the electric current flowing through the solenoid coil 21.

In an electronic fuel injection system incorporating the above-noted solenoid actuated valve device 10 as shown in FIG. 1, a carburetor 50 has an air cleaner 51 of a known type at the upper top end thereof, and is connected to an engine intake manifold 52 so that air flow may be produced, during engine operation, from the air cleaner 51 through a measuring plate 53 of an air flow meter 54 and then past a throttle valve 55 into the intake manifold 52. The inlet port 16 of the solenoid actuated valve device 10 of the present invention is connected by means of a conduit 60 to a port 56 positioned in the portion between the measuring plate 53 and the throttle valve 55, while the output port 17 is connected by means of a conduit 61 to a port 57 positioned in the intake manifold 52. The valve device 10 serves to increase the air volume sucked into the intake manifold 52 when the engine is in the idling movement, thereby increasing the idling speed of the engine when the engine is started in the cold condition. A computer, not shown, produces the electric signal in response to the engine temperature, the air volume sucked into the carburetor 50, engine speed, etc., and transmits the electric signal to the solenoid coil 21 of the valve device 10.

Figure 3:
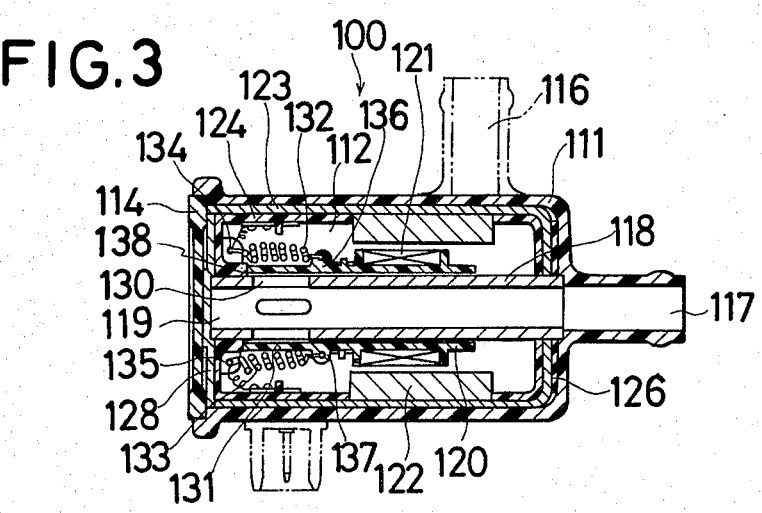
FIG. 3 is a sectional view of a second embodiment of the solenoid actuated valve device according to the invention.

The second embodiment of a solenoid actuated valve device in accordance with the present invention is shown in FIG. 3. A solenoid actuated valve device 100 of the present invention comprises a cup-shaped body member 111 defining a generally cylindrical internal chamber 112. The cover member 114 is sealingly connected to the body member 111 by a suitable connecting means, and closes the open end of the body member 111. The body member 111 has an inlet port 116 communicating with the internal chamber 112, and an outlet port 117.

Axially positioned in the internal chamber 112 is a core 118 which is made of a suitable magnetic material. The core 118 comprises a central hollow portion 119 communicating with the outlet port 117. Slidably mounted on the core 118 is a bobbin 120 which is made of a suitable nonmagnetic material. The solenoid coil 121 which generates the magnetic force is wound on the bobbin 120. A pair of permanent magnets 122 are positioned so that the magnetic flux of the magnets 122 may intersect at right angles to the winding of the solenoid coil 121. A yoke 123 made of a magnetic material is securely disposed in the inner peripheral surface of the body member 111 so that the yoke 123 surround the magnets 122. The core 118, the solenoid coil 121 wound on the bobbin 120, permanent magnets 122, and the yoke 123 constitute a linear motor of movable coil type. The magnets 122 are supported by a support member 124 which is made of nonmagnetic material and inserted within the yoke 123. A rubber plate 126 interposed between the body member 111 and the yoke 123 forms a seal between the body 111 and the core 118. A plate member 128 made of a magnetic material is rigidly secured at the outer periphery thereof between the cover member 114 and the left end of the yoke 123.

The core 118 has plurality of passages 130 formed thereon which provide the communication between the hollow portion 119 and the internal chamber 112. The section of the passages 130 is elongated in the axial direction of the core 118. Since the bobbin 120 is slidably mounted on the core 118, a sliding valve 131 formed on the bobbin 120 in one piece can slide on the open portions of the passages 130. That is to say, the sliding valve 131 moves and controls the open area of the passages 130 in proportion to the electric current flowing through the solenoid coil 121.

A pair of coil springs 132, 133 are positioned within internal chamber 112. Each one end of the springs 132, 133 is connected to a pair of insulating collars 134, 135 fixed on the support member 124, while each other end of the springs 132, 133 is connected to a pair of projections 136, 137 formed on the bobbin 120. Accordingly, the bobbin 120 is always biased toward the left, as shown in FIG. 3, by the force of the springs 132, 133.

In the absence of energization of the solenoid coil 121, the springs 132, 133 maintain the bobbin 120 in engagement with a stop surface 138 of the support member 124, whereby the sliding valve 131 is maintained in the rest position thereof closing the passages 130. Upon energization of the solenoid coil 121, the bobbin 120 moves to the right, as shown in FIG. 3, overcoming the force of the springs 132,133, whereby the sliding valve 131 controls the open area of the passages 130.

At the same time, the springs 132, 133 are electrically connected to both terminals of the solenoid coil 121, respectively. Therefore, the solenoid coil 121 is electrically connected through the springs 132, 133 and electrical lead-in wires (not shown) to a suitable electric source such as the computer of the first embodiment of the present invention.

Figure 4:
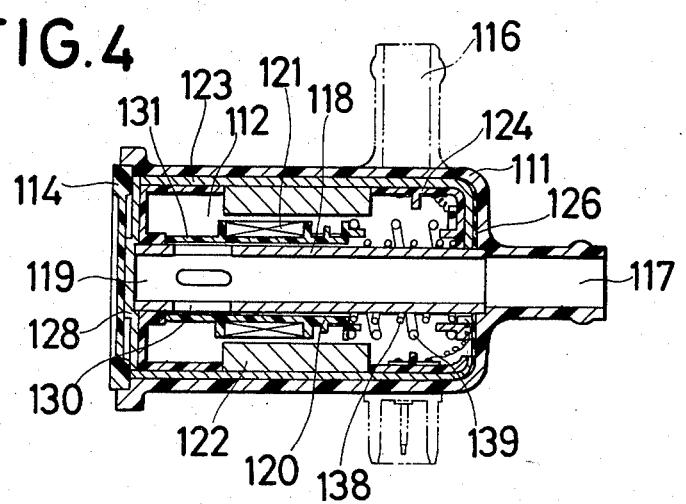
FIG. 4 is a sectional view similar to FIG. 3 but showing a modified embodiment of the solenoid actuated valve device.

In the second embodiment of the solenoid actuated valve device as shown in FIG. 3, a pair of springs 132, 133 are of the same form. It should be noted, however, that such springs 132, 133 will be easily modified into two coil springs 138, 139 which differ from each other in their diameters as shown in FIG. 4 wherein similar elements serving similar functions are provided with the same reference numerals as shown in FIG. 3.

Thus, by connecting the springs 132, 133 or 138, 139 to the solenoid coil 121, that is to say, by employing the springs as the means for transmitting the electric signals, the movable portion of the electrical lead-in wires can be eleiminated. Therefore, the durability of the lead-in wires will improve markedly.

Figure 5:
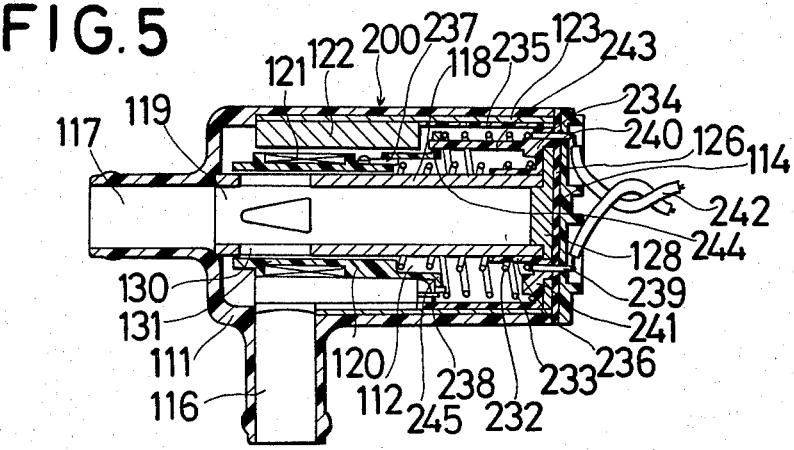
FIG. 5 is a sectional view of third embodiment of the solenoid actuated valve device according to the invention.

The third embodiment of the solenoid actuated valve device is shown in FIG. 5, wherein similar elements serving similar functions are provided with the same reference numerals as shown in FIG. 3. The solenoid actuated valve device of the present invention is generally indicated by reference numeral 200.

Figure 6:
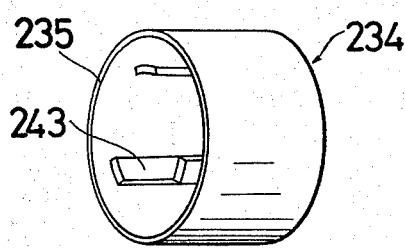
FIG. 6 is a perspective view of a guiding member of the solenoid actuated vlave device in FIG. 5.

In FIG. 5, securely disposed within the internal chamber 112 is a guiding member 234, as shown in FIG. 6, made of a suitable insulating material such as synthetic resin. An outer peripheral wall 235 of the guiding member 234 engages with the inner peripheral surface of the yoke 123, while an inner peripheral wall 236 engages with the outer peripheral surface of the core 118. A first coil spring 232 and a second coil spring 233 which differ from each other in their diameters are interposed between the bobbin 120 and the guiding member 234. Therefore, the bobbin 120 is always biased toward the left, as shown in FIG. 5, by the force of the first and the second springs 232, 233. A pair of terminals 237, 238 of the solenoid coil 121 are fixed in the bobbin 120. On the other hand, a pair of terminals 239, 240 fixed in a bottom wall 241 of the guiding member 234 are electrically connected to electric lead-in wires 242. One end of the first spring 232 is electrically connected to the terminal 237, while the other end thereof is electrically connected to the terminal 239. One end of the second spring 233 is electrically connected to the terminal 238, while the other end thereof is electrically connected to the terminal 240. Accordingly, the solenoid coil 121 is electrically connected to a suitable electric source through the springs 232, 233 and the lead-in wires 242. That is to say, the springs 232, 233 act as the means for transmitting the electric signals from the electric source to the solenoid coil 121.

The guiding member 234 has three supports 243 which are projected from the bottom wall 241 thereof and are interposed between the first and the second springs 232, 233. Since the supports 243 serve as an insulator, the supports 243 can prevent the springs 232, 233 from coming in contact with each other and short-circuitting even if the springs 232, 233 are given shocks or vibrations. The bobbin 120 has holes 244 in a flange 245 thereof so that the supports 243 may pass through the holes 244. Accordingly, the bobbin 120 can move axially on the core 118 without rotating about the axis thereof.

Figure 8:
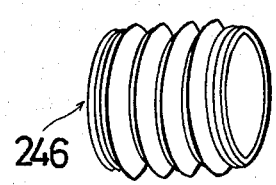
FIG. 8 is a perspective view of an insulator of the solenoid actuated valve device in FIG. 7.
Figure 7:
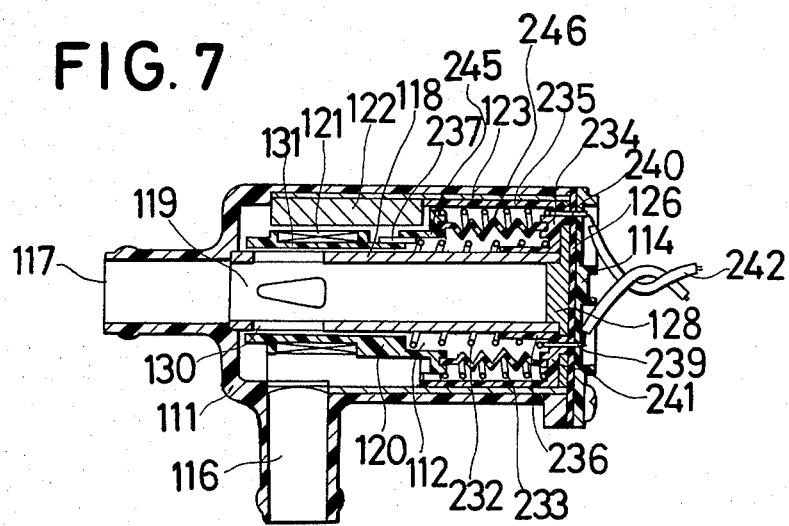
FIG. 7 is a sectional view similar to FIG. 5 but showing a modified embodiment of the solenoid actuated valve device.

A modified embodiment of the third embodiment is shown in FIG. 7 and FIG. 8, wherein similar elements serving similar function are provided with the same reference numerals as shown in FIG. 5.

Interposed between the first and the second springs 232, 233 is an insulator 246 made of a suitable elastic material such as synthetic rubber. One end of the insulator 246 is fixed in the flange 245 of the bobbin 120, while the other end thereof is fixed in the bottom wall 241 of the guiding member 234. Insulator 246 having elastically can expand and contract in the axial direction thereof in response to the movement of the bobbin 120.

In the third embodiment and its modified embodiment of the solenoid actuated valve device, the supports 243 of the guiding member 234 and the insulator 246 are interposed between the first and second springs 232, 233. It will be apparent, however, that at least one of the springs 232, 233 can be coated with an insulating material instead of employing the supports 243 and the insulator 246.

Figure 9:
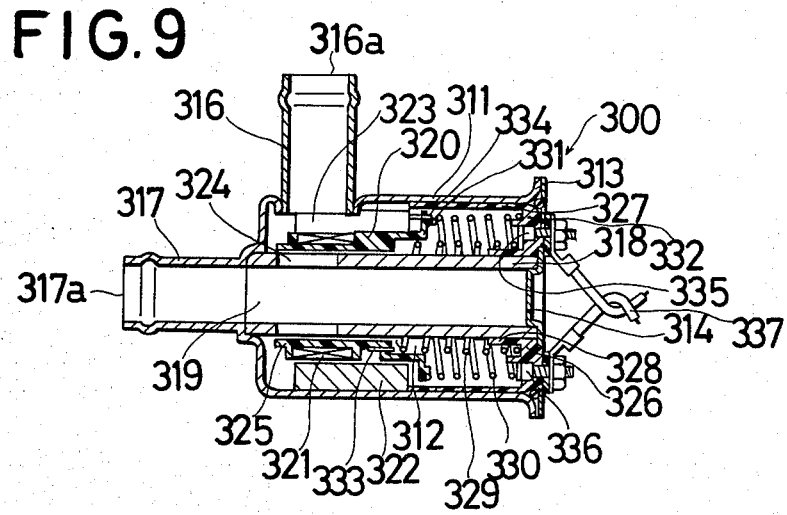
FIG. 9 is a sectional view of a fourth embodiment of the solenoid actuated valve device according to the invention.

The fourth embodiment of the solenoid actuated valve device is shown in FIG. 9. The solenoid actuated valve device of the present invention is generally indicated by reference numeral 300.

A cup-shaped body member 311 made of a suitable magnetic material defines a generally cylindrical internal chamber 312 and has a flange 313 at the open end thereof. A cover member 314 made of a suitable magnetic material is sealingly connected to the flange 313 by a suitable connecting means, and closes the open end of the body member 311. An inlet pipe 316 having an inlet port 316a is fixed in the body member 311 by a suitable means such as soldering, while an outlet pipe 317 having an outlet port 317a is formed in the body member 311. The inlet port 316a communicates with the internal chamber 312.

Axially positioned in the internal chamber 312 is a core 318 which is made of a suitable magnetic material. The core 318 comprises a central hollow portion 319. One end of the hollow portion 319 communicates with the outlet port 317a, while the other end of the hollow portion 319 is closed by the cover member 314. Slidably mounted on the core 318 is a bobbin 320 which is made of a suitable nonmagnetic material such as synthetic resin. A solenoid coil 321 which generates the magnetic force is wound on the bobbin 320. A pair of permanent magnets 322, 323 are positioned so that the magnetic flux of the magnets 322, 323 may intersect at right angles to the winding of the solenoid coil 321. The core 318, the solenoid coil 321, and the magnets 322, 323 constitute a linear motor of movable coil type.

The core 318 has a plurality of passages 324 formed therethron which provide the communication between the hollow portion 319 and the internal chamber 312. Each section of the passages 324 is elongated in the axial direction of the core 318. Since the bobbin 320 is slidably mounted on the core 318, a sliding valve 325 formed on the inner peripheral surface of the bobbin 320 can slide on the open portions of the passages 324.

Securely disposed within the internal chamber 312 is a guiding member 326 made of a suitable insulating material such as synthetic resin. An outer peripheral wall 327 of the guiding member 326 engages with the inner peripheral surface of the body member 311, while an inner peripheral wall 328 engages with the outer peripheral surface of the core 318. A first coil spring 329 and a second coil spring 330 which differ from each other in their diameters are interposed between a flange 331 of the bobbin 320 and a bottom wall 332 of the guiding member 326. Therefore, the bobbin 320 is always biased toward the left, as shown in FIG. 9, by the force of the first and the second springs 329, 330. A pair of terminals 333, 334 of the solenoid coil 321 are fixed in the flange 331 of the bobbin 320. On the other hand, a pair of terminals 335, 336 of electric lead-in wires 337 are fixed in the bottom wall 332 of the guiding member 326. One end of the first spring 329 is electrically connected to the terminal 333, while the other end is electrically connected to the terminal 335. One end of the second spring 330 is electrically connected to the terminal 334, while the other end is electrically connected to the terminal 336. Accordingly, the solenoid coil 321 is electrically connected to a suitable electric source through the springs 329, 330 and the lead-in wires 337.

In the solenoid actuated valve device 300 as previously indicated according to FIG. 9, the body member 311 serving as a housing of the device 300 is made of a suitable magnetic material. That is to say, since the body member 311 serves for the yoke disposed in the outside of the linear motor, too, the magnetic loss of the magnets 322, 323 decreases. As a result, the capacity in operation will improve markedly.

In each embodiment of the solenoid actuated valve device, by coating the outer peripheral surface of the core with metal having wear-resistance or with resin whose coefficient of friction is small, the core will improve in durability and decrease in sliding friction. As a result, the sliding valve will be stable in operation, and improve in durability and in reliability markedly during operation.

It will be desirable to employ chrome as the metal having wear-resistance, and polyimide as the resin whose coefficient of friction is small.

Although the invention has been illustrated and described in the preferred embodiments thereof, it will be apparent to those skilled in the arts to which it pertains that many changes and modifications may be made thereto without departing from the scope and the spirit of the appended claims.

What is claimed is:

1. A solenoid actuated valve device for electrically controlling the flow of fluid comprising;
   a body member having at least a portion thereof made of magnetic material, said body member having a pair of ports thereon and defining an internal chamber in communication with one of said ports,
   a core made of magnetic material axially positioned in said internal chamber, said core comprising a cylindrical wall member defining a central hollow portion therein in communication with the other of said ports, said magnetic material portion of said body member and said core forming a magnetic circuit,
   a bobbin made of non-magnetic material slidably mounted on said core,
   a solenoid coil wound on said bobbin,
   permanent magnet means positioned in said body member so that the magnetic flux thereof may intersect at right angles to the winding of said solenoid coil,
   radial passage means formed through the cylindrical wall member of said core in order to provide communication between said hollow portion and said internal chamber,
   valve means operatively associated with said bobbin and having an internal surface thereof disposed in sliding engagement with the outer surface of said core for opening and closing said passage means in response to movement of said bobbin, and
   spring means biasing said bobbin so that said sliding valve may close said passage means.

2. A solenoid actuated valve device according to claim 1, wherein said valve means is formed on said bobbin in one piece.

3. A solenoid actuated valve device according to claim 1, wherein said spring means comprises two coil springs which are electrically connected to said solenoid coil and act as a means for transmitting electric signals.

4. A solenoid actuated valve device according to claim 3, wherein said two coil springs are of the same form.

5. A solenoid actuated valve device according to claim 3, wherein said two coil springs differ from each other in coil diameters.

6. A solenoid actuated valve device according to claim 5, further comprising an insulator made of an elastic material and interposed between said two coil springs in order to prevent said two coil springs from coming in contact with each other.

7. A solenoid actuated valve device according to claim 5, further comprising a guiding member made of an insulating material and securely disposed within said internal chamber.

8. A solenoid actuated valve device according to claim 7, wherein said guiding member has supports interposed between said two coil springs in order to prevent said two coil springs from coming in contact with each other.

9. A solenoid actuated valve device according to claim 5, wherein at least one of said two coil springs is coated with an insulating material.

10. A solenoid actuated valve device according to claim 1, wherein the outer peripheral surface of said core is coated with metal having wear-resistance.

11. A solenoid actuated valve device according to claim 1, wherein the outer peripheral surface of said core is coated with resin whose coefficient of friction is small.

12. A solenoid actuated valve device according to claim 10, wherein said metal is chrome.

13. A solenoid actuated valve device according to claim 11, wherein said resin is palyimide.

14. A solenoid actuated valve device as set forth in claim 1, wherein said body member is made entirely of magnetic material.

15. A solenoid actuated valve device as set forth in claim 1, wherein said body member further comprises a portion of non-magnetic material disposed outwardly of said portion of magnetic material.

* * * * *